United States Patent [19]
Weitz et al.

[11] 3,865,800
[45] Feb. 11, 1975

[54] MANUFACTURE OF POLYMERS OF CYCLOOLEFINS BY RING-OPENING POLYMERIZATION OF CYCLOOLEFINS

[76] Inventors: Hans-Martin Weitz, 17 Wildstrasse, 6710 Frankenthal; Helmut Schwarz, 17 Grasse Casse, 6700 Ludwigshafen, both of Germany

[22] Filed: Jan. 4, 1973

[21] Appl. No.: 320,846

[52] U.S. Cl. ............................ 260/93.1, 252/429
[51] Int. Cl. ............................................ C08f 5/00
[58] Field of Search ............................... 260/93.1

[56] References Cited
UNITED STATES PATENTS
3,577,400  5/1971  Judy................................. 260/88.2
3,657,208  4/1972  Judy............................... 260/88.2 R Primary Examiner—John C. Bleutge
Attorney, Agent, or Firm—Johnston, Keil, Thompson & Shurtleff

[57] ABSTRACT

A process for the manufacture of polymers of cycloolefins by ring-opening polymerization of cycloolefins using a catalyst system which consists of (1) a transition metal salt, (2) an organometallic compound of an element in group IVa and (3) an aluminum halide, provided that, per mole of catalyst component (1), there are present from 0.1 to 100 moles of catalyst component (2) and from 0.1 to 250 moles of catalyst component (3). This process makes it possible to manufacutre polymers of cycloolefins in a particularly advantageous manner.

3 Claims, No Drawings

MANUFACTURE OF POLYMERS OF CYCLOOLEFINS BY RING-OPENING POLYMERIZATION OF CYCLOOLEFINS

The present invention relates to a process for the manufacture of polymers of cycloolefins by ring-opening polymerization of cycloolefins using a catalyst system.

Polymers of this kind have recently become very interesting, e.g. polymers of cyclopentene ("1,5-polypentenamers"). Vulcanizates produced from these polymers are characterized by desirable physical properties (high abrasion resistance, slip resistance and elasticity).

It is an object of the present invention to provide a process of the above type which shows advantages over prior art processes of comparable nature.

We have found that this object is achieved in a process for the manufacture of polymers of cycloolefins by ring-opening polymerization of cycloolefins using a catalyst system, when said catalyst system is one consisting of:
1. a transition metal salt,
2. an organometallic compound of an element in group IVa and
3. an aluminum halide, provided that, per mole of catalyst component (1), there are present from 0.1 to 100 moles of catalyst component (2) and from 0.1 to 250 moles of catalyst component (3).

It has been found advantageous to use, per mole of catalyst component (1), from 1 to 50 moles of catalyst component (2) and from 1 to 100 moles of catalyst component (3), and it is particularly advantageous to use, per mole of catalyst component (1), from 2 to 20 moles of catalyst component (2) and from 2 to 50 moles of catalyst component (3).

The following remarks relate to the materials used in the present invention.

The cycloolefins to be polymerized should, as usual, be as pure as possible and in particular contain no catalyst poisons. Suitable compounds for the polymerization are, for example, unsaturated alicyclic compounds, preferably monoolefins, in particular cyclopentene and cyclooctene. The amount of cycloolefin used should be such that the molar ratio of catalyst system to olefin is greater than 1:100.

Particularly suitable transition metal salts (1) are the halides of the transition metals in group VIb, preferably the (oxy)halides of chromium, molybdenum and tungsten, particularly their (oxy)chlorides. Especially suitable are $WCl_6$ and $MoCl_5$. The halides and oxyhalides may be used alone or in the form of mixtures of two or more of said components.

Preferred organomettalic compounds of elements in group IVa used as components (2) are alkyl and aryl lead compounds (e.g. lead tetramethyl and lead tetraethyl) and the corresponding compounds of tin (e.g. tin tetramethyl, tin tetra-ethyl, tin tetrabutyl and tin tetrahexyl) and the total number of carbon atoms in each compound should not exceed 75. Dialkyl tin salts of organic acids (e.g. dibutyl tin dilaurate and dibutyl tin maleate) may also be used.

The aluminum halide used as component (3) is preferably the trichloride, but the tribromide is also suitable on account of its good solubility in organic solvents. Aluminum iodide may also be used. The trihalides may be used alone or in the form of mixtures of two or more of said trihalides.

The process itself may be carried out at temperatures of from $-20°$ to $+150°$ C and preferably from $+10°$ to $+50°$ C, and at the pressures automatically obtained at the temperature used. It is gnerally convenient to use hydrocarbons as solvents. One suitable solvent is benzene. Saturated hydrocarbons such as cyclohexane and n-hexane may also be used, the risk of alkylation of these solvents by Friedel-Crafts reactions being avoided (Example 2). Before the commencement of polymerization, the cycloolefin should be present in the solvent in the form of a 1 to 50% and in particular 10 to 30% v/v solution. Alternatively, the process may be carried out without added solvent, in which case the cycloolefin itself acts as solvent. To avoid polymer solutions of unduly high concentration, it is often convenient, particularly in the last-named case, to stop polymerization at a suitable stage. This may be effected in conventional manner by the addition of proton-active compounds such as alcohols, e.g. methanol, or phenols, e.g. 2,6-di-t-butyl-p-cresol. Isolation of the polymers from their solutions may also be effected in conventional manner, particularly by precipitation using, for example, alcohols (e.g. methanol).

Polymerization probably proceeds according to the following scheme (illustrating the use of cyclopentene):

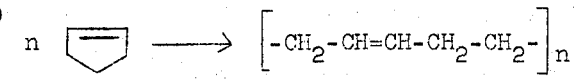

NMR analyses of cyclopentene polymers showed the correct ratio of vinyl, allyl and aliphatic protons for the above structure (2:4:2) within the normal margin of error (cf. Example 1). Where cyclooctene is used (Example 3), the NMR analysis of the polymers also showed the correct ratio of vinyl, allyl and aliphatic protons (2:4:8) for the above scheme. The polymer of cyclooctene is less elastic than that of cyclopentene however.

All operations are carried out with rigid exclusion of air and moisture. The olefins and solvents are purified and dried thoroughly, and the $WCl_6$ is freed from impurities by sublimation.

EXAMPLE 1

To a suspension of 0.3749 g (2.8116 millimoles) of $AlCl_3$ (anhydrous) in 180 ml of benzene, placed in a flask, there are added at room temperature 0.60629 g (1.8744 millimoles) of $Pb(C_2H_5)_4$ and the mixture is stirred for 10 minutes. 4.686 ml of a 0.05M solution of $WCl_6$ in benzene (0.2343 millimoles) and 34.06 g (0.5 moles) of cyclopentene are then added to cause the temperature to rise by about 5° C. The molar ratio of $WCl_6$ to $Pb(C_2H_5)_4$ to $AlCl_3$ to cyclopentene is 1:8:12:2133.

After a further 30 minutes, the reaction is stopped by the addition of 10 ml of a 6% w/w solution of 2,6-d-t-butyl-p-cresol in an 80/20 v/v mixture of benzene/methanol or by the addition of 10 ml of methanol. The viscous solution is diluted with 300 ml of benzene and added dropwise to 4 l of methanol to cause precipitation of the polymer. The polymer is boiled with methanol and then dried in a vacuum drying cabinet at 40° C. There are thus obtained 12.95 g (38% of theory) of transparent elastic polymer. The structure of the polymer is confirmed for example by its NMR spectrum giving a proton ratio of vinyl:allyl:aliphatics of 1.86:4.0:2.0.

On precipitation of the polymer and distillation from benzene, methanol and unreacted cyclopentene, there are found Friedel-Crafts alkylation products in the resulting organic residue.

EXAMPLE 2

Example 1 is repeated except that cyclohexane is used as solvent, the $WCl_6$ being dissolved in 50 ml of the 180 ml of cyclohexane used, and an elastic polymer is also obtained. In this case, however, no Friedel-Crafts alklation products are found.

EXAMPLE 3

Following the procedure described in Example 1, 0.3749 g (2.8116 millimoles) of $AlCl_3$ (anhydrous), 0.60629 g (1.8744 millimoles) of $Pb(C_2H_5)_4$, 4.686 ml of a 0.05M solution of $WCl_6$ in benzene (0.2343 millimoles) and 55.1 g (0.5 mole) of cyclooctene in 260 ml of benzene are reacted at room temperature. The molar ratio of $WCl_6$ to $Pb(C_2H_5)_4$ to $AlCl_3$ to cyclooctene is 1:8:12:2133. The product is worked up in the manner described in Example 1 after 40 minutes.

There is obtained a polymer having a proton ration (NMR spectrum) of vinyl, allyl and aliphatic protons of 1.82:4.0:8.4. This product has somewhat weaker elastic properties than the polymer of cyclopentene.

We claim:

1. In a process for the manufacture of polymers of cyclopentene by ring-opening polymerization of cyclopentene using a catalyst system, wherein the catalyst system used is one consisting of
   1. the transition metal salt $WCl_6$,
   2. the organometallic compound $Pb(C_2H_5)_4$ and
   3. a suspension of $AlCl_3$, and wherein per mole of catalyst component (1), there are present from 0.1 to 100 moles of catalyst component (2) and from 0.1 to 250 moles of catalyst component (3), the improvement which comprises: mixing a suspension of $AlCl_3$ with $Pb(C_2H_5)_4$ and thereafter adding $WCl_6$ followed by the addition of cyclopentene.

2. A process as claimed in claim 1, wherein the molar ratio of catalyst system to cyclopentene is greater than 1:100.

3. An improved process as in claim 1, wherein $AlCl_3$ is mixed with $Pb(C_2H_5)_4$ for ten minutes before $WCl_6$ is added.

* * * * *

UNITED STATES PATENT AND TRADEMARK OFFICE
CERTIFICATE OF CORRECTION

PATENT NO. : 3,865,800

DATED : February 11, 1975

INVENTOR(S) : Hans-Martin Weitz et al.

It is certified that error appears in the above-identified patent and that said Letters Patent are hereby corrected as shown below:

In the Heading, insert--[30] January 11, 1972  Germany

P 22 01 161.6 -

Signed and Sealed this eighteenth Day of May 1976

[SEAL]

Attest:

RUTH C. MASON
*Attesting Officer*

C. MARSHALL DANN
*Commissioner of Patents and Trademarks*